UNITED STATES PATENT OFFICE.

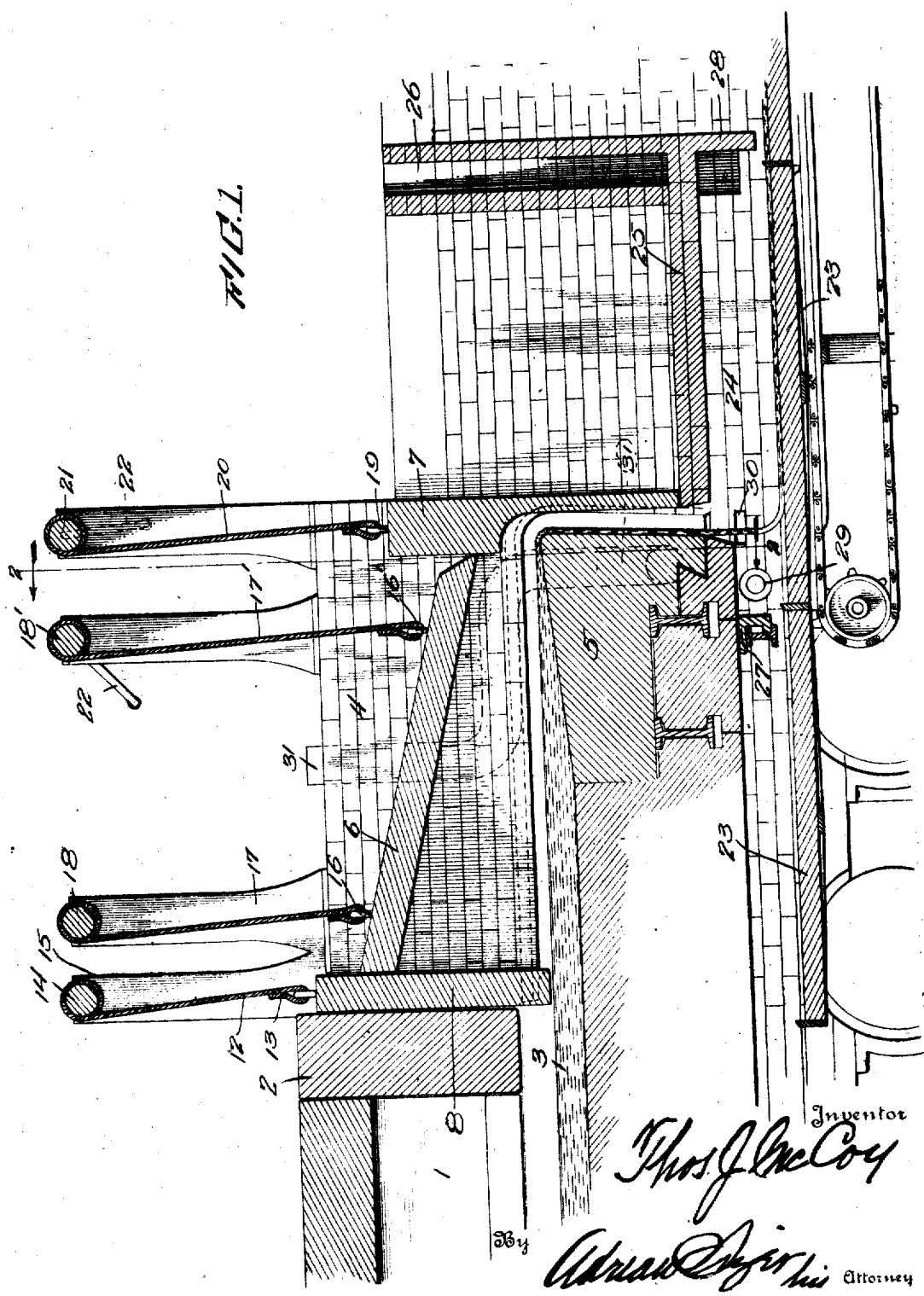

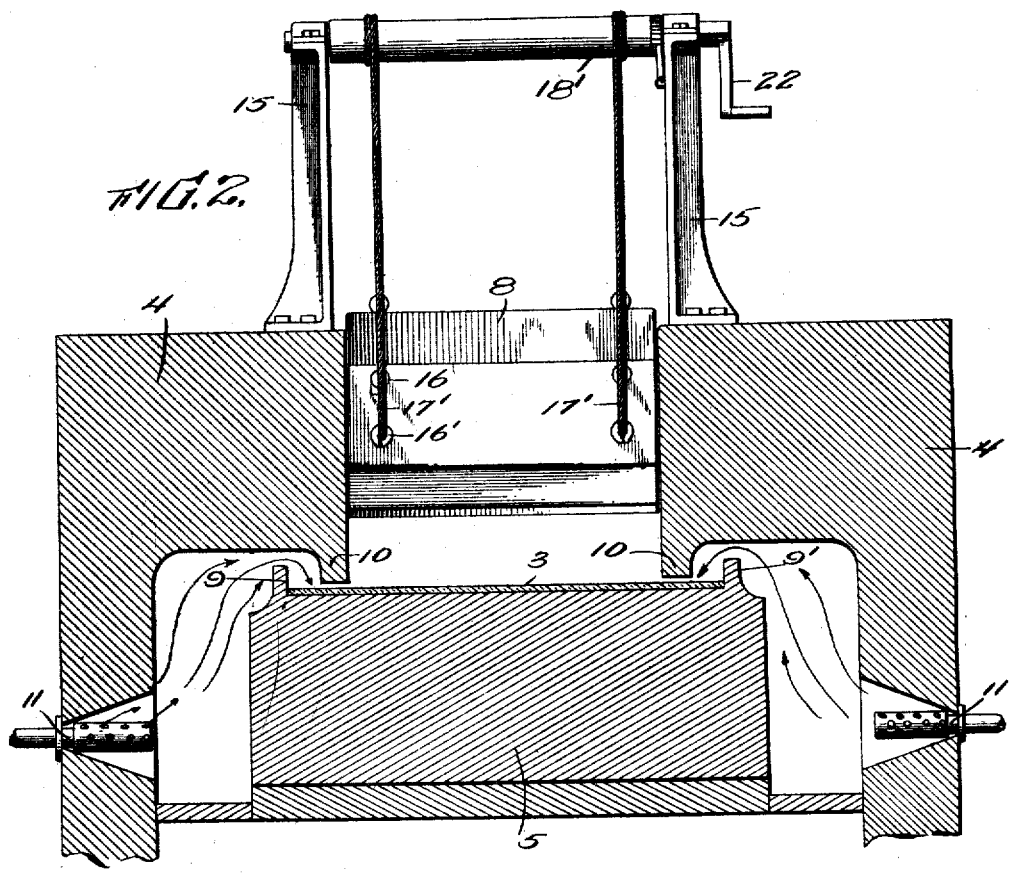
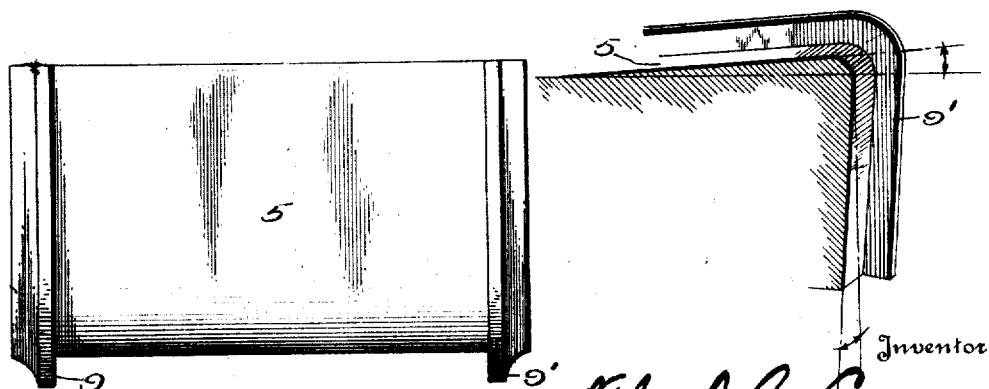

THOMAS J. McCOY, OF WICHITA FALLS, TEXAS.

GLASS MANUFACTURE.

1,283,538.　　　Specification of Letters Patent.　　Patented Nov. 5, 1918.

Application filed May 22, 1916. Serial No. 99,079.

*To all whom it may concern:*

Be it known that I, THOMAS J. McCOY, a citizen of the United States, residing at Wichita Falls, in the county of Wichita and State of Texas, have invented certain new and useful Improvements in Glass Manufacture, of which the following is a specification.

This invention relates to an improved apparatus for the manufacture of glass articles, such as for example window glass or other forms of sheet glass.

The primary object of this invention is to convert the molten glass into sheet formation by an apparatus which dispenses with the usual means employed in blowing, drawing, ladling, pouring from pots, crucibles and the like, and flattening, annealing etc., of the glass at intermittent periods. These and further objects will more fully appear from the following description in which reference will be had to the accompanying drawings, forming a part of this application which shows a form of apparatus embodying my said invention and wherein:

Figure 1, is a fragmentary sectional view of the discharge end of a glass tank, and accessories showing a sheet of glass being formed by flowing a sheet from the molten glass in the tank.

Fig. 2, represents a cross section of Fig. 1, on the lines *a—a*.

Fig. 3, is a top plan view of the flowing stone or spout.

Fig. 4, is a perspective view of a section of the spout over which the glass is flowed.

Referring to the drawings, Fig. 1, represents the glass tank containing the molten glass, and except as to that portion of the tank from which the glass is discharged, this tank may be of any desired construction, although preferably of such construction as shown in my prior application for U. S Letters Patent, Serial No. 652,780, filed by me on October 4, 1911, but as to the discharge or flowing end it is of novel construction especially adapted for carrying out my improvement in glass manufacture.

Located across the end of the glass tank 1, is an arch wall 2, extending over and above the glass 3, in the tank. Forward of the arch wall 2, and connected therewith are side walls 4, which with other accessories hereinafter referred to, form a discharge chamber or compartment through which the glass passes from the main tank 1, to the sheet forming devices. Located upon suitable supports between the side walls 4, and forming the bottom of the discharge end of the compartment, is a flowing stone or apron 5, of refractory material, which constitutes an important feature of this invention. Located between the side walls 4, and adapted for vertical movement, is a cover stone 6, forming the roof of the compartment through which the glass passes. Located forward of the cover stone 6, and the flowing stone 5, and adapted for vertical movement is the end stone 7, forming the outer end wall of the compartment. Located back of the cover stone 6, and in close proximity to the arch wall 2, and adapted for vertical movement is the damper stone 8, which forms the rear end wall of the flowing compartment.

The flowing stone or spout 5, is formed with projecting ribs 9—9, running horizontally along the edges thereof, and 9'—9', running downwardly along the forward face thereof. These projecting ribs form an important element of this invention. Referring to the drawings, (Fig. 2) the walls 4, are shown with inwardly projecting extensions at their upper portions from which are downwardly projecting ribs 10—10, the lower surfaces of which are placed in close proximity to the glass line level above the flowing stone 5.

Referring to the drawings (Fig. 2), it will be observed that there is an air space between the lower portion of the side walls 4, and the flowing stone 5. This air space is adapted for conveying heat created by the burners 11, to the edges of the glass between the projecting ribs 9 and 10, the importance of which will be hereinafter more fully explained.

To facilitate the vertical movement of the damper stone 8, it is freely suspended by a cable 12, attached to an eye-bolt 13, set into the stone 8. The cable 12 is adapted to be wound on a suitable winding drum 14, adapted for rotative movement in the fixed standards 15.

To provide for the vertical movement of the cover stone 6, as well as for changing the angularity of the inclinations thereof, I provide for suspending the cover stone 6, from two eye-bolts 16 and 16', through which are passed the ends of cables 17 and 18

17′, the opposite ends of which are adapted to be wound on the drums 18 and 18′. By the varied movement of the winding drums 18 and 18′, the angularity of the cover stone 6, may be fixed in any desired position.

To facilitate the vertical movement of the end stone 7, the lower end of cable 20, is attached thereto by means of the eye-bolt 19. The upper end of the cable 20 is adapted to be wound on the drum 21. Any suitable means may be adapted to rotate the winding drums, and for that purpose, I provide the hand crank 22, shown in Fig. 2.

By the vertical movement of the several stones 6, 7 and 8, I am able to increase or decrease the air space within the discharge chamber, and I am able to regulate the temperature within the passage way through which the glass is flowed, when passing over the flowing stone 5. To provide for the further uniformity of the temperature of all portions of the sheet of glass being flowed, and especially in maintaining the edges of the glass at a uniform temperature with other portions of the sheet, I have provided the extended ribs 9 and 9′, and provide for a suitably shaped air space around the extended ribs 9 and 9′, to project the heat from the burners 11, in the most effective way upon the edges of the sheet of glass, and to maintain the temperature of the elevated ribs 9 and 9′, against which the glass edges come in contact, to the proper degree to facilitate their maintaining the same temperature to the edges of sheet as the temperature of other portions thereof.

I have found from practical experience, that it is difficult to produce and maintain the required temperature in all portions of a sheet of glass which is being gradually reduced in thickness. I have also found that by the use of the novel formation of the outer end of the flowing stone 5, (Fig. 4) I can control and maintain the glass at a more uniform flowing temperature. When the sheet of glass passes along the top surface of the flowing stone 5, and turns in its downward path along the downwardly inclined wall which is inclined slightly backward from a vertical line, it will require a greater degree of heat to freely move in a horizontal plane, than it required to move downward or along a vertically inclined plane. I can therefore maintain the glass at a sufficiently high temperature to move freely along the horizontal, and allow it to gradually assume a decreased temperature and still move freely along the vertically inclined wall.

Practical experience has demonstrated that molten glass moving in a horizontal plane will move much slower at a given temperature, than if it were moving downwardly over a vertically disposed surface having the force of gravity to off-set the clinging of the glass to the guiding surface.

I have also found that molten glass moving slowly in practically a horizontal plane will become devitrified where it comes in contact with the guiding means. The devitrification of the glass is the result of its remaining too long at a certain low temperature, and this is more apt to occur at the edges of the sheet, rather than in the central portions thereof. It is very important that the edges of a sheet of molten glass move as fast as the center, in order to flow a perfectly flat sheet of glass. Where the center is of a higher temperature than the edges, the center will flow faster than the edges, causing a variation in the thickness of the sheet.

I overcome these many difficulties by the use of my improved flowing stone or spout 5, by which I am able to maintain the glass at a proper temperature throughout all portions of the sheet to the degree required in perfecting a uniformity of flow. I am also able to maintain and keep in contact with the glass, a suitable guiding means up to the point where the sheet has assumed a congealed condition by which the sheet formation will be maintained until the glass is fully congealed. By the novel formation of the downwardly inclined surface of the flowing stone in diverging away from the perpendicular line, I am able to facilitate the separation of the glass from the terminal portion of the guiding means. I am also able to maintain a suitable temperature in the sheet edges in their downward passage along the front face of the apron stone, by the conduction from the projecting ribs 9, formed on the vertically inclined face of the flowing spout, which receives the proper degree of temperature from the heat generated by the burners 11. I am therefore able to keep the glass in contact with the guiding means during a gradual congealing thereof, until it has sufficiently set to maintain its sheet formation, and is adapted to be deposited upon a suitable support or conveyer such as a series of moving tablets 23—23, more clearly and substantially shown and described in my prior application for U. S. Letters Patent, Serial No. 853,292 filed July 27, 1914.

In order that the flowing operation may be successfully carried out, it is essential that the surfaces of the apron stone 5, over which the moving glass passes, should not become of such high temperature as to interfere with the proper congealing of the glass, as it passes along the downward face of the flowing spout. The means for proper regulation and the novel formation of the adjustable shields placed within the flowing zone, as well as the formation of the flowing spout, constitute some of the principal characteristics of this invention, and by which I am able to produce a continuous flow of a layer of glass from a liquid state to a gradually congealed state without any unnatural strains so prevalent where tension is applied to glass while in its congealing state.

For the purpose of taking care of the products of combustion, and to cause the movement of the heat over the surfaces of the flowing sheet, a suitable passage way is provided for, extending downwardly, following the path of the glass along the vertically inclined surface of the stone 7, and under the roof 25, of the leer 24, and out through a suitable flue 26, connecting with the leer 24, said flue communicating with a suitable stack located in convenient position (not shown) as is well known in the art.

For the purposes of maintaining the heat within the leer 24, a suitable mantel stone 27, is placed across the path of the moving tablets 23, near the depositing point of the glass on the tablets. A similar mantel stone 28, is placed at the outer end of the leer at a point near the opening of the flue 26. To provide for adding additional heat to the leer at a point back of the depositing point of the glass on the tablets 23, aperture 29, is placed in the side walls of the leer into which a suitable burner may be inserted.

To facilitate the observance of the flow of the glass by the operator as it leaves the apron stone 5, I have provided a small aperture 30, in the side wall of the leer 24.

In the initial operation of adapting the glass flowing zone to the production of sheet glass, stones 6, 7 and 8, are raised so as to allow the free passage of heat from the glass tank 1, over the apron stone into the leer 24. The heat is allowed to take this course for the required period to heat the apron stone 5, and the leer 24, before the flowing operation begins. After the glass has started to flow the stone 7 is raised still higher so as to expose to the cooler air the glass flowing down the front face of the apron stone while stone 6 is further lowered so as to prevent the cooler air from entering that part of the flowing zone beneath the stone 6, and thereby improperly congealing the glass before its downward movement along the front face of the apron stone. It may be found necessary in the regulation of the temperature to further lower stone 8, to keep the heat from passing from the main tank 1, to the flowing zone under stone 6. To further regulate the temperature independent of the movement of the adjustable stones 6, 7 and 8, the heat from the burners 11, is applied to the air space between the walls 4 and the stone 5 applies heat to the sheet edges of the glass where it comes in contact with the extended rib 9.

The heat from the air space between the walls 4, and the stone 5, may be adapted to be diverted through suitable flues, having apertures at the top of the side walls 4, and inlets communicating with the air space at points below the level of the glass flow.

These flues 31, may be entirely or partially closed as required. When closed the heat from the burners 11, will be forced out along the sides of the apron stone 5, thereby heating the sheet glass edges.

It will be observed from the foregoing description, that the glass from which the sheets are formed is conveyed from a mass upon a gradual shallowing flume or spout, located within a suitable temperature regulated flowing zone, and by the novel arrangements which I have provided, I am able to furnish a continuous supply of glass and form it into a sheet as it moves onward in its flow, while maintaining the edges of the proper degree of heat to prevent it from clinging to the guiding surface, and at the same time provide for the gradual cooling of the glass in such a manner that it is maintained at the required thickness, and preserve the surfaces while it is being conveyed upon a suitable carrier during the period from partial congealing to the complete solidification. I am able to produce this result by the novel formation of my device, by which the degrees of temperature are controlled and governed according to the requirements necessary for a successful flowing of sheet glass of any desired thickness.

Without limiting myself to the specific instrumentalities described, what I claim is:

1. A glass working apparatus comprising a tank containing molten glass, having a discharge chamber integral therewith, provided with an upwardly inclined bottom wall, positioned to normally carry a portion of the volume of the glass in the tank, side walls adjacent to said bottom wall, having ledges extending inwardly over the glass carried by said bottom wall, and a vertically movable cover wall freely suspended between said ledges.

2. An apparatus of the character described, comprising a tank containing molten glass, including a stationary outlet portion, having a bottom wall constituting an apron upwardly inclined toward its outer portion, positioned to normally carry a portion of the volume of the glass in said tank, and to exude the same in a continuous sheet, side walls spaced apart from said bottom wall having at their upper portions inwardly extending ledges, positioned over the glass and an upper wall freely suspended between said ledges.

3. An apparatus of the character described, comprising a tank containing molten glass, including a stationary outlet portion, having a bottom wall constituting an apron upwardly inclined toward its outer portion, positioned to normally carry a portion of the volume of glass in said tank, and to exude the same in a continuous sheet, side walls spaced apart from the apron wall, having inwardly extended heat deflecting ledges above the plane of glass flow, and a cover wall freely suspended between said heat deflecting ledges.

4. An apparatus of the character described, comprising a tank containing molten glass, including a stationary outlet portion, having a bottom wall constituting a flowing apron, positioned to normally carry a portion of the volume of the glass in said tank, said apron presenting a continuous uniform inclination on its top surface and having an end surface deflected backward from the perpendicular, with sheet width forming dikes to control the width of flow of the glass over said apron stone, substantially as described.

5. A glass working apparatus comprising a tank containing molten glass, including a discharge chamber having side walls provided with ports for the admission of heat, a lower wall projecting beyond the main portion of the front wall of the tank, positioned to normally carry a portion of the volume of the glass in said tank, inwardly projecting ledges extending from said side walls over the lower wall, air passages extending upwardly between each side wall and the bottom wall, and joining at a point above the bottom wall, and means for controlling the temperature of said air passages.

6. A glass working apparatus, comprising a discharge chamber in glass tanks, having side walls provided with ports for the admission of hot gases, a bottom wall inclined upwardly, and positioned to normally carry a portion of the volume of the glass in said tank, having upwardly extended dikes at the outer edges thereof, inwardly extended projections from said side walls being provided with downwardly extending projections located between the dikes on said bottom wall, extending to a plane between the top of the dikes and the glass level, substantially as described.

7. A glass working apparatus, comprising a discharge chamber for glass tanks, provided with an upwardly inclined bottom wall, positioned to normally carry a portion of the volume of the glass in said tank, having upwardly extending dikes located outside of the glass area, side walls spaced apart from said bottom wall, having inwardly projecting ledges extending over said bottom wall, provided with downwardly extended projections in parallel relation to said dikes located in a plane between the top of the dikes and the glass line level, substantially as described.

8. A discharge chamber for glass tanks, having side walls provided with ports for the admission of heat, a bottom wall spaced apart from said side walls having an inclined surface located in a plane above the ports, inwardly projecting ledges extending from said side walls over the bottom wall, a freely suspended top wall located between said ledges, and forming an air passage between said ports.

9. A discharge chamber for glass tanks, having side walls provided with ports for the admission of heat, a bottom wall spaced apart from said side walls, having an inclined surface located in a plane above said ports, provided with upwardly extending dikes at the outer edges thereof, inwardly projecting ledges extending from said side walls over the bottom wall, provided with downwardly extending projections located in planes between said dikes, a freely suspended top wall located between the inwardly projecting ledges, and forming a glass air passage between said ledges and dikes, substantially as described.

10. An apparatus of the character described, comprising a tank containing molten glass, including a discharge chamber integral therewith, having a bottom wall constituting a glass flowing apron positioned to normally carry a portion of the volume of the glass in said tank, said apron presenting a continuous uniform inclination on its top surface, and having an end surface diverging away from the vertical line, with sheet width forming dikes to control the width of the flow of glass over said surfaces, and means for varying the volume and temperature of air within said discharge chamber.

In testimony whereof I have affixed my signature in presence of two witnesses.

THOMAS J. McCOY.

Witnesses:
L. T. GRANBERRY,
G. F. AIREY.